(12) United States Patent
Nies

(10) Patent No.: US 12,078,147 B2
(45) Date of Patent: Sep. 3, 2024

(54) BLADE LIFTING ASSEMBLY FOR MOUNTING A BLADE TO OR UNMOUNTING A BLADE FROM A ROTOR HUB OF A WIND TURBINE

(71) Applicant: General Electric Renovables Espana, S.L., Barcelona (ES)

(72) Inventor: Jacob Johannes Nies, Salzbergen (DE)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/557,749

(22) Filed: Dec. 21, 2021

(65) Prior Publication Data

US 2022/0195989 A1    Jun. 23, 2022

(30) Foreign Application Priority Data

Dec. 23, 2020   (EP) .................................... 20217047

(51) Int. Cl.
*F03D 13/20*   (2016.01)
*F03D 13/10*   (2016.01)

(52) U.S. Cl.
CPC .............. *F03D 13/20* (2016.05); *F03D 13/10* (2016.05); *F05B 2230/61* (2013.01); *F05B 2240/912* (2013.01); *F05B 2260/30* (2013.01)

(58) Field of Classification Search
CPC .......... F03D 13/20; F03D 13/10; F03D 13/00; F05B 2230/61; F05B 2240/912; F05B 2240/917; F05B 2260/30
See application file for complete search history.

(56) References Cited

U.S. PATENT DOCUMENTS

| | | |
|---|---|---|
| 11,092,139 B2 | 8/2021 | Fenger |
| 2010/0003141 A1 | 1/2010 | Hancock |
| 2013/0323007 A1 | 12/2013 | Falkenberg et al. |
| 2015/0028608 A1 | 1/2015 | Wubbelmann |
| 2018/0195497 A1 | 7/2018 | Neumann |

FOREIGN PATENT DOCUMENTS

| | | |
|---|---|---|
| EP | 2623768 A1 | 8/2013 |
| EP | 2670977 B1 | 5/2019 |

(Continued)

OTHER PUBLICATIONS

European Search Report Corresponding to EP20217047.8 on Jun. 16, 2021.

(Continued)

*Primary Examiner* — Christopher J. Besler
(74) *Attorney, Agent, or Firm* — Dority & Manning, P.A.

(57) ABSTRACT

A blade lifting assembly (50) for mounting a blade (22) to or unmounting a blade (22) from a rotor hub (20) of a wind turbine (10), including a gripper (52) configured for gripping a central region (54) of the blade (22), the gripper (52) including a blade rotation device (56) configured for rotating the blade (22) about a rotational axis perpendicular to a longitudinal blade axis (76) of the blade (22); a root support device (70) configured to be mounted to a root section (71) of the blade (22); and connecting members (74) connecting the root support device (70) to the gripper (52), the connecting members (74) being configured for transmitting an axial load (82) of the blade (22) from the root support device (70) to the gripper (52).

12 Claims, 6 Drawing Sheets

(56) References Cited

FOREIGN PATENT DOCUMENTS

WO     WO2017/071719 A1     5/2017
WO     WO2018/054440 A1     3/2018

OTHER PUBLICATIONS

Amesweb, Column Buckling Calculator, 4 Pages. Retrieved Dec. 8, 2021 from: https://amesweb.info/Beam/Column-Buckling-Calculator.aspx.
Liftra, LT870-1 Blade Yoke, Blade Yoke for lifting the REpower 615m and LM 615m blades 3 Pages. Retrieved Dec. 8, 2021 from https://liftra.com/product/blade-yoke-lt870/.
Liftra, LT975 Blade Dragon, 3 Pages. Retrieved Dec. 8, 2021 from https:/liftra.com/product/blade-dragon/.
Liftra, LT5002-1 Blade Eagle, Blade Yoke for 73.2 m LM Blades, 3 Pages. Retrieved Dec. 8, 2021 from https://liftra.com/product/blade-yoke/.
Moulin, New Rotor Blade Lifter Allows Assembly in Bunny-Ear Configuration for Gearless Wind Turbines, Energetica India, Aug. 20, 2014, 3 Pages. Retrieved Dec. 8, 2021 from http://www.energetica-india.net/news/new-rotor-blade-lifter-allows-assembly-in-buony-ear-configuration-for-gearless-wind-turbines.

BLADE LIFTING ASSEMBLY FOR MOUNTING A BLADE TO OR UNMOUNTING A BLADE FROM A ROTOR HUB OF A WIND TURBINE

FIELD

The present disclosure relates generally to wind turbines, and more particularly to a blade lifting assembly for mounting a blade to or unmounting a blade from a rotor hub of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The size of rotor blades contributes to the energy efficiency of wind turbines. In particular, an increase in rotor blade size can increase the energy production of a wind turbine. The economic benefits of increased wind turbine sizes or rotor blade sizes must be weighed against respective costs of manufacturing, transporting, assembly or repair of the wind turbines. Often, the assembly of a wind turbine involves mounting a rotor hub of the rotor to the nacelle on top of the tower, and lifting each rotor blade individually to the rotor hub using a crane. For example, the blade may be lifted and installed to the rotor hub with a blade axis oriented in a horizontal direction.

With increasing wind turbine size or blade size, cranes with increased height or increased lifting capacity may be used to lift the blades. However, the use of such cranes can increase costs associated with mounting or unmounting of blades to or from the rotor hub, for example during assembly or disassembly of the wind turbine, or during repair or replacement of rotor blades.

Accordingly, the present disclosure is directed to a blade lifting assembly for mounting a blade to or unmounting a blade from a rotor hub of a wind turbine that can provide a safe, fast and/or cost-efficient raising, lowering and/or positioning of blades for mounting or unmounting the blades.

BRIEF DESCRIPTION

Aspects and advantages of the invention will be set forth in part in the following description, or may be obvious from the description, or may be learned through practice of the invention.

In one aspect, the present disclosure is directed to a blade lifting assembly for mounting a blade to or unmounting a blade from a rotor hub of a wind turbine. The blade lifting assembly includes a gripper configured for gripping a central region of the blade, the gripper including a blade rotation device configured for rotating the blade about a rotational axis perpendicular to a longitudinal blade axis of the blade. The blade lifting assembly includes a root support device configured to be mounted to a root section of the blade, and connecting members connecting the root support device to the gripper, the connecting members being configured for transmitting an axial load of the blade from the root support device to the gripper. It should be understood that the blade lifting assembly may further include any of the additional features as described herein.

In another aspect, the present disclosure is directed to a lifting apparatus for mounting a blade to or unmounting a blade from a rotor hub of a wind turbine. The lifting apparatus includes a crane including a crane hook, and a blade lifting assembly according to embodiments described herein, wherein a gripper of the blade lifting assembly is hooked to the crane hook.

In yet another aspect, the present disclosure is directed to a method of mounting a blade to or unmounting a blade from a rotor hub of a wind turbine, the wind turbine comprising a tower and a nacelle mounted on the tower, the rotor hub being coupled to the nacelle. The method includes gripping a central region of the blade using a gripper. The method includes mounting a root support device to a root section of the blade. The method includes connecting the root support device to the gripper using connecting members, the connecting members being configured for transmitting an axial load of the blade from the root support device to the gripper. The method includes moving the blade in a vertical direction using a crane having a crane hook, the crane hook being hooked to the gripper. The method includes rotating the blade about a rotational axis perpendicular to a longitudinal blade axis of the blade using a blade rotation device of the gripper. The method includes connecting the blade to the rotor hub or disconnecting the blade from the rotor hub. It should be understood that the method may further include any of the additional steps and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
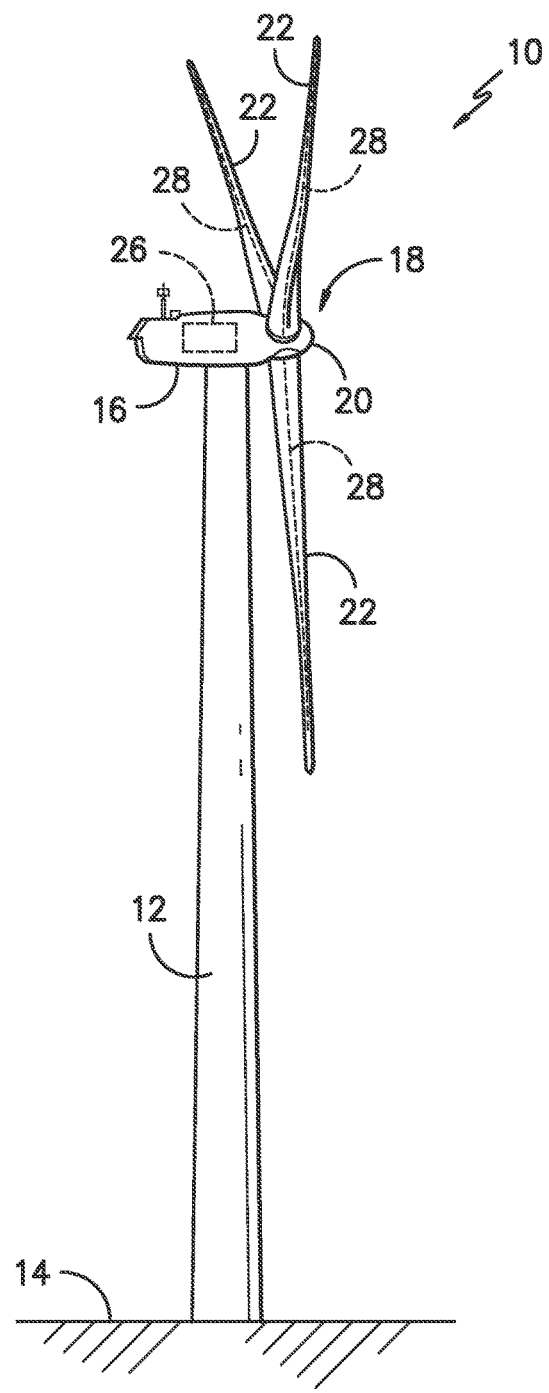
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10 according to the present disclosure. As shown, the wind turbine 10 generally includes a tower 12 extending from a support surface 14 (herein also referred to as ground), a nacelle 16 mounted on the tower 12, and a rotor 18 coupled to the nacelle 16.

As shown in FIG. 1, the rotor 18 includes a rotatable rotor hub 20 and at least one blade 22 coupled to and extending outwardly from the rotor hub 20. For example, in the illustrated embodiment, the rotor 18 includes three blades 22. However, in an alternative embodiment, the rotor 18 may include more or less than three blades 22. Each blade 22 may be spaced about the rotor hub 20 to facilitate rotating the rotor 18 to enable kinetic energy to be transferred from the wind into usable mechanical energy, and subsequently, electrical energy. For instance, the rotor hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to various different functions, such as receiving, transmitting and/or executing wind turbine control signals.

Figure 2:
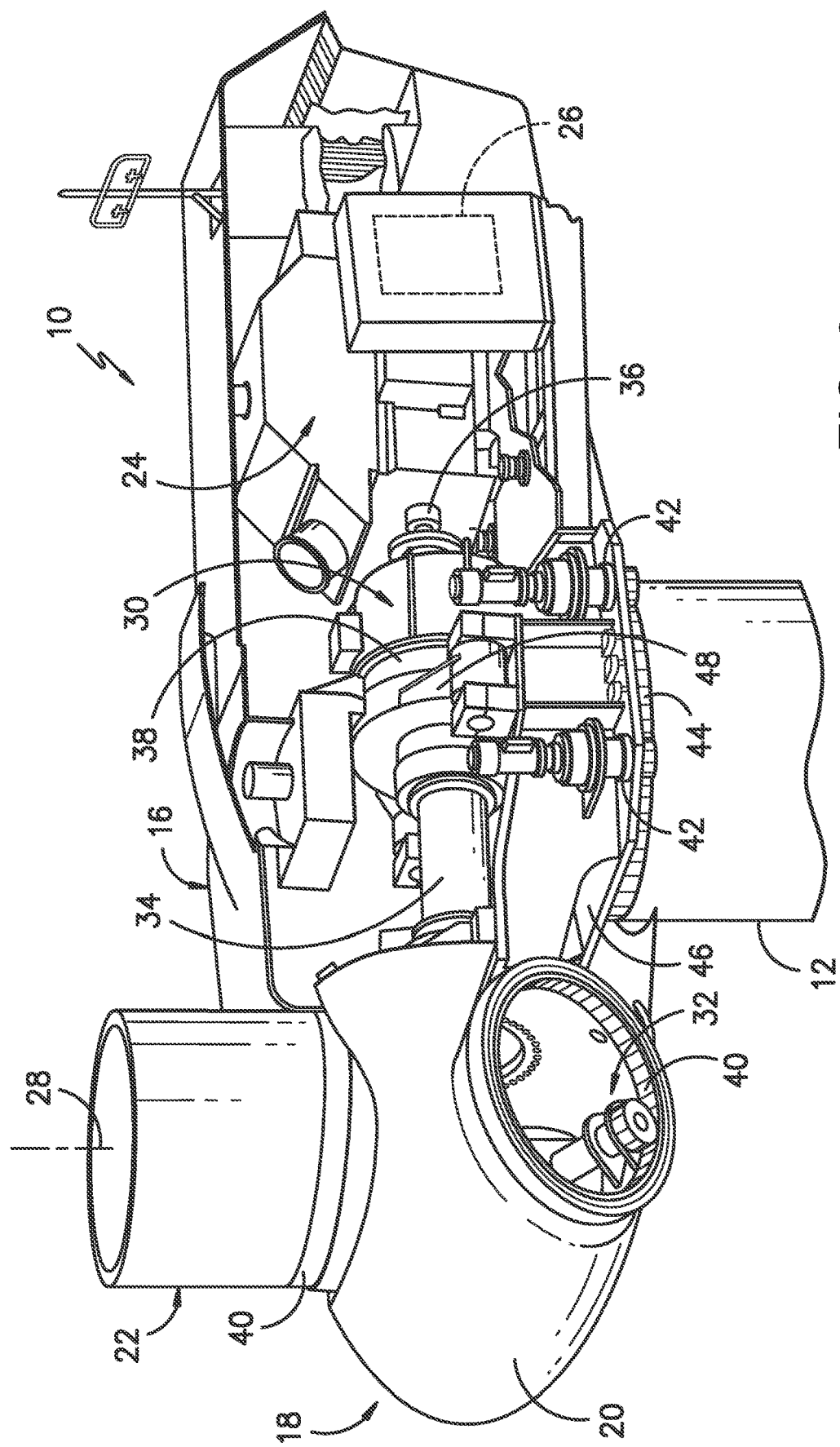
FIG. 2 illustrates a simplified, internal view of a nacelle of a wind turbine, particularly illustrating the nacelle during normal operation.

Referring now to FIG. 2, a simplified, internal view of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the rotor hub 20. Thus, the gearbox 30 converts the low speed, high torque input to a high speed, low torque output to drive the gearbox output shaft 36 and, thus, the generator 24.

Each blade 22 may also include a pitch adjustment mechanism 32 configured to rotate each blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

Mounting or unmounting of the blades to or from a rotor hub for assembly, disassembly or repair of the wind turbine often involves lifting or lowering a blade with the longitudinal blade axis oriented in a horizontal direction. Gripping the blade with a gripper and tilting the blade with respect to the horizontal axis may involve high gripping forces, particularly with a risk of damaging or crushing the blade or an outer skin of the blade. As such, the present disclosure is directed to a blade lifting assembly 50 for mounting a blade 22 to or unmounting a blade 22 from a rotor hub 20 of a wind turbine 10 that can provide a safe, fast and/or cost-efficient raising, lowering or positioning of the blades 22 for mounting or unmounting the blades 22.

According to embodiments of the present disclosure, the blade lifting assembly 50 includes a gripper 52. In embodiments, the gripper 52 includes gripping members 67. The gripping members 67 can be connected to a gripper frame 62 of the gripper 52. In embodiments, the gripper 52 includes gripper pads. In particular, the gripper pads may be arranged on the gripping members 67. The gripper pads may be configured for contacting an outer skin of the blade 22. A gripping force between the gripper 52 and the blade 22 may be provided by a friction force between the gripping pads of the gripper 52 and the outer skin of the blade 22. In some embodiments, the gripper 52 includes a gripper actuator for actuating at least one of the gripping members 67 towards the outer skin of the blade 22 for gripping the blade 22 or away from the outer skin of the blade 22 for releasing the blade 22. In embodiments, the gripper 52 is configured for gripping the blade 22 on a first side of the blade 22 and on a second side of the blade, particularly for gripping the blade on the first side and on the second side using the gripper pads. Each of the first side and the second side may extend from a trailing edge of the blade to a leading edge of the blade, the first side being different from the second side.

In embodiments of the present disclosure, the gripper 52 is configured for gripping a central region 54 of the blade 22. The central region 54 may be understood as an axial region of the blade 22, in particular as an axial region including the center of gravity of the blade 22. As used herein, the terms "axial", "radial", "tangential" or "circumferential" are particularly understood with respect to a longitudinal blade axis 76 of the blade 22. In some embodiments, the gripper 52 includes gripping members 67 and gripper pads for contacting the outer skin of the blade 22 at a first axial position and at a second axial position. The gripper 52 may be configured for gripping the blade 22 such that the center of gravity of the blade 22 is disposed axially between the first axial position and the second axial position.

Figure 3:
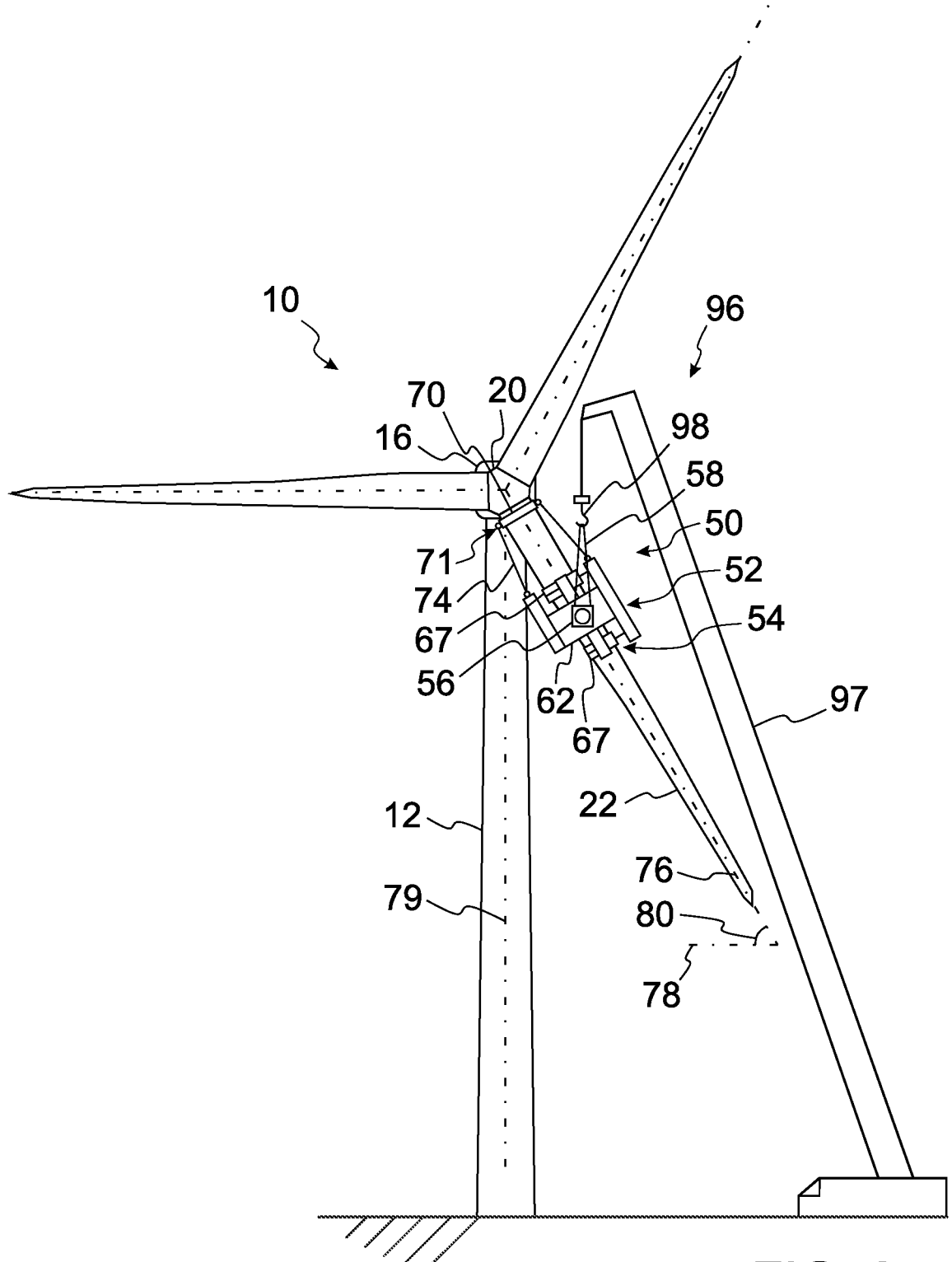
FIG. 3 illustrates a view of a wind turbine during mounting of a blade to a rotor hub according to embodiments of the present disclosure.

For example, FIG. 3 illustrates a view of a wind turbine 10 during mounting of a blade 22 to a rotor hub 20 mounted to a nacelle 16 of the wind turbine 10, the nacelle 16 being mounted on tower 12 of the wind turbine 10. The blade 22 is lifted by a lifting apparatus 96 including a crane 97 and a blade lifting assembly 50. The blade 22 is gripped by a gripper 52 of a blade lifting assembly 50. The gripper 52 includes gripping members 67 and gripper pads arranged on the gripping members 67. The gripper 52 grips the blade 22 with the gripping members 67 at a first axial position and at a second axial position around the center of gravity of the blade 22.

According to embodiments, the gripper 52 includes a blade rotation device 56 configured for rotating the blade 22 about a rotational axis perpendicular to a longitudinal blade axis 76 of the blade 22. In embodiments, the rotational axis can be at least substantially perpendicular to a longitudinal tower axis 79 of the tower 12. The rotational axis can be a horizontal axis. A horizontal axis, horizontal direction or horizontal plane is understood as being at least substantially perpendicular to the direction of the gravitational force. In some embodiments, the blade rotation device 56 may be configured for rotating the blade 22 about a vertical axis.

In embodiments, the blade rotation device 56 includes a first device part and a second device part. The blade rotation device 56 may include a motor for rotating the first device part relative to the second device part. The first device part may be connected to a crane link 58 of the gripper 52. The crane link 58 may be configured for hooking the gripper 52 to a crane hook 98 of a crane 97. The second device part may be connected to the gripper frame 62 of the gripper 52 or to the gripping members 67.

According to embodiments, the blade lifting assembly 50 includes a root support device 70 configured to be mounted to a root section 71 of the blade 22. In embodiments, the root section 71 includes a root of the blade 22. The root section 71 may include an axial root region at the root of the blade 22. In embodiments, the root section 71 may particularly have a round circumference around the longitudinal blade axis 76, particularly an at least substantially circular circumference or an oval circumference.

In embodiments, the root support device 70 is configured to be mounted to the root section 71 by clamping the root support device 70 to the root section 71. In particular, clamping may include any of bidirectional clamping, multidirectional clamping, tangential or circumferential clamping or radial clamping. For example, the root support device 70 may be mounted to the root section 71 of the blade 22 using a band clamp, as illustrated, e.g., in FIG. 3.

In some embodiments, the root support device 70 is configured to be mounted to the root section 71 by joining a first joint component 72 of the root support device 70 to a second joint component 73 of the root section 71. In embodiments, the first joint component 72 and the second joint component 73 may be joined by positive locking. In embodiments, the first joint component 72 or the second joint component 73 include at least one of a bolt, a thread, a hook and an eye. In particular, the first joint component 72 may be bolted to the second joint component 73. In exemplary embodiments, the second joint component 73 can be connected to a bolted connection of a blade bearing of the blade 22. In some embodiments, the root support device 70 may be clamped to the root section 71 and mounted to the root section 71 by joining a first joint component 72 to a second joint component 73. In some embodiments, the second joint component 73 may be permanently connected to the blade. In further embodiments, the second joint component 73 may be removable, particularly removable before normal operation of the wind turbine 10.

Figure 4:
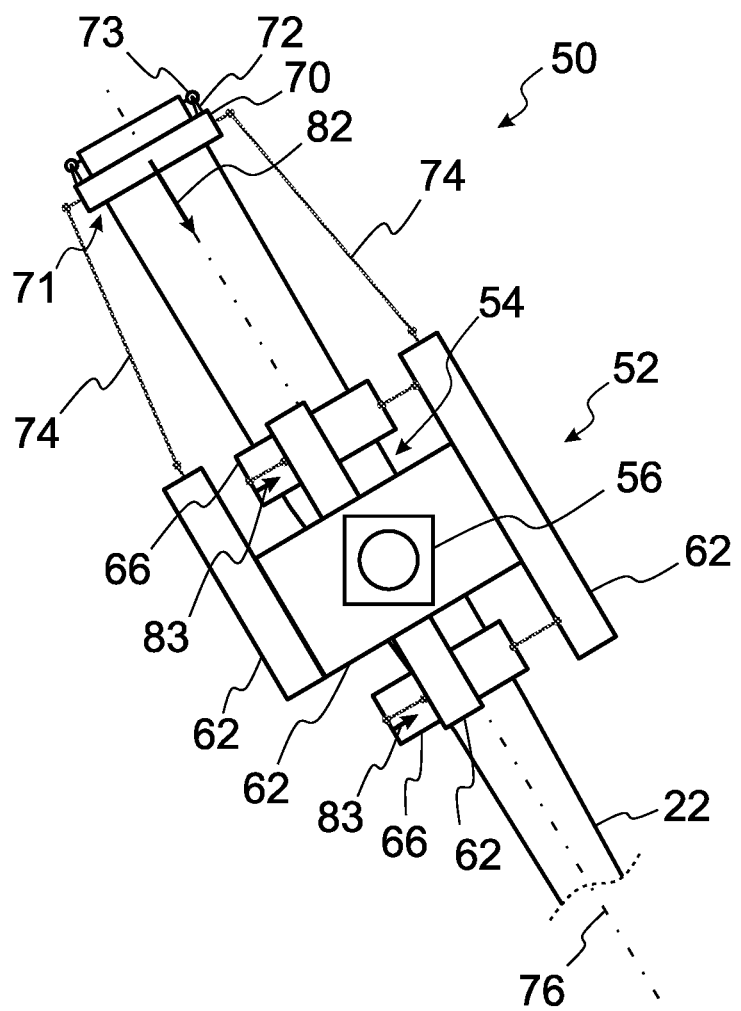
FIG. 4 illustrates a view of a blade and a blade lifting assembly according to embodiments of the present disclosure.

For example, FIG. 4 shows a blade lifting assembly 50, wherein the root support device 70 is circumferentially clamped to the root section 71 of the blade 22. A first joint component 72 includes hooks extending from the root support device 70 towards the root end of the blade 22. The hooks of the first joint component 72 are hooked to a second joint component 73, the second joint component particularly including eyes protruding from the root section 71 in radial directions.

According to embodiments of the present disclosure, the blade lifting assembly 50 includes connecting members 74 connecting the root support device 70 to the gripper 52. In particular, the connecting members 74 connect the root support device 70 and the gripper 52 in an axial direction. In embodiments, the connecting members 74 are configured for transmitting an axial load 82 of the blade 22 from the root support device 70 to the gripper 52. The axial load 82 may for example include an axial component of a gravitational load of the blade 22. The axial load 82 may include wind loads of the blade 22 in the direction of the longitudinal blade axis 76. In embodiments, the connecting members 74 can have an axial length of at least 2 m, particularly of at least 4 m or of at least 6 m, and/or of maximum 20 m, particularly of maximum 15 m or maximum 10 m. The connecting members 74 may be configured to transmit an axial load of at least 10 kN, particularly of at least 30 kN, of at least 50 kN or of at least 80 kN. In some embodiments, the connecting members 74 are configured to transmit an axial load of at least 25% of the blade weight, particularly at least 50% of the blade weight, at least 75% of the blade weight or at least the blade weight.

In embodiments, the connecting members 74 include at least one of a rod, a beam, a wire, a chain and a rope. In some embodiments, the connecting members 74 may include stiff connecting members. The stiff connecting members may have a fixed length or an adjustable length. For example, the connecting members 74 may include a rod with an adjustable length or a tubular rod. In FIG. 4, the connecting members 74 include tubular rods.

In some embodiments, the blade lifting assembly 50 is configured for rotating the blade 22 to an inclined orientation using the blade rotation device 56. In the inclined orientation, an angle 80 between the longitudinal blade axis 76 and a reference plane 78 perpendicular to a longitudinal tower axis 79 can be larger than 20 degrees, particularly larger than 25 degrees, and/or maximum 60 degrees, particularly maximum 50 degrees or maximum 45 degrees. For example, the blade lifting assembly 50 may be configured for rotating the blade 22 to an angle 80 of up to 30 degrees.

In embodiments, the blade lifting assembly 50 may be configured for rotating the blade 22 to an angle 80 larger than 30 degrees, particularly larger than 45 degrees or larger than 60 degrees. For example, the blade lifting assembly 50 configured for rotating the blade 22 to an angle 80 of up to 90 degrees.

In some embodiments, the blade lifting assembly 50 is configured to rotate the blade 22 such that the root section 71 points in an upward direction. The blade lifting assembly 50 can be configured to rotate the blade 22 such that the root section 71 points in a downward direction. The connecting members 74 may include stiff connecting members such as a rod or a beam. Stiff connecting members may particularly transmit an axial load 82, when the root section 71 points in an upward direction or in a downward direction. In further embodiments, the blade lifting assembly 50 may be configured to rotate the blade 22 such that the root section 71 points in a downward direction, particularly only in a downward direction. The connecting members 74 may include tension-loadable connecting members, e.g., a chain, a wire or a rope. An upward direction and a downward direction are to be understood particularly with respect to a direction of a gravitational force.

For example, in FIGS. 3 and 4 a blade 22 is inclined to an angle 80 of approximately 60 degrees. The root section 71 points in an upward direction. The axial load 82 includes at least a first portion of an axial component of a gravitational force of the blade 22. The axial load 82 can be supported at the blade 22 by the root support device 70. The axial load 82 is transmitted from the root support device 70 via the connecting members 74 to the gripper 52.

A gripping part 66 of the gripper 52 may support a transverse load 83 of the blade 22, as illustrated for example in FIG. 4. The transverse load 83 may particularly include a component of the gravitational force of the blade 22 in a direction perpendicular to the longitudinal blade axis 76. In embodiments, the gripping part 66 is configured for gripping the blade 22. The gripping part 66 may include for example the gripping members 67 and/or the gripper pads. In an orientation of the blade 22, in which the longitudinal blade axis 76 is oriented at least substantially in a horizontal plane, the transverse load 83 may include at least substantially the weight of the blade 22. In embodiments, the gripping part 66 may support a further axial load of the blade 22, particularly including a second portion of the axial component of the gravitational force of the blade 22. The gripping part 66 may support the further axial load via a friction contact between the gripping part 66, e.g. the gripper pads, and the outer skin of the blade 22. In embodiments, the second portion of the axial component of a gravitational force may be smaller than the first portion supported by the root support device 70. The axial load 82, the further axial load and the transverse load 83 may be transmitted via the crane link 58 of the gripper 52 to the crane 97.

In some embodiments, the gripper 52 may include a counterweight, wherein the gripping part 66, the crane link 58 and the counterweight are arranged in this order in a direction of the rotation axis. The counterweight may include at least 25% of the blade weight, particularly at least 50% of the blade weight, and/or maximum 125% of the blade weight, particularly maximum the blade weight. A combined center of gravity of the blade 22 and the blade lifting assembly 50 may be shifted by the counterweight in a direction of the rotation axis away from the blade 22.

Figure 5A:
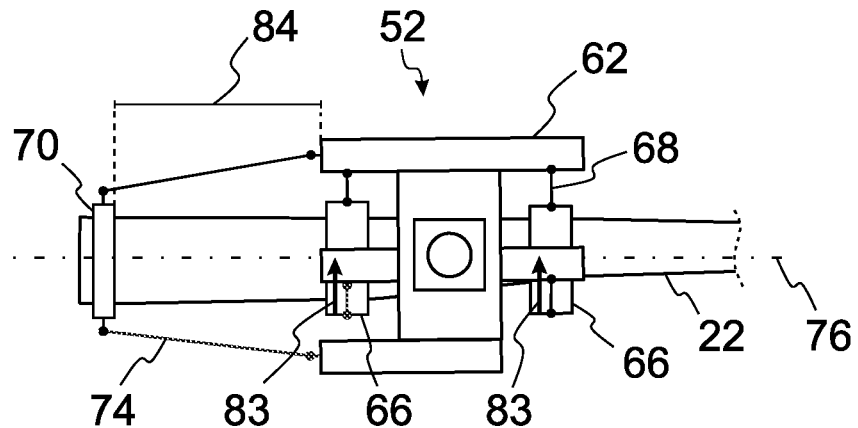
FIGS. 5A-5C each illustrate a view of a blade and a blade lifting assembly according to further embodiments of the present disclosure.
Figure 5B:
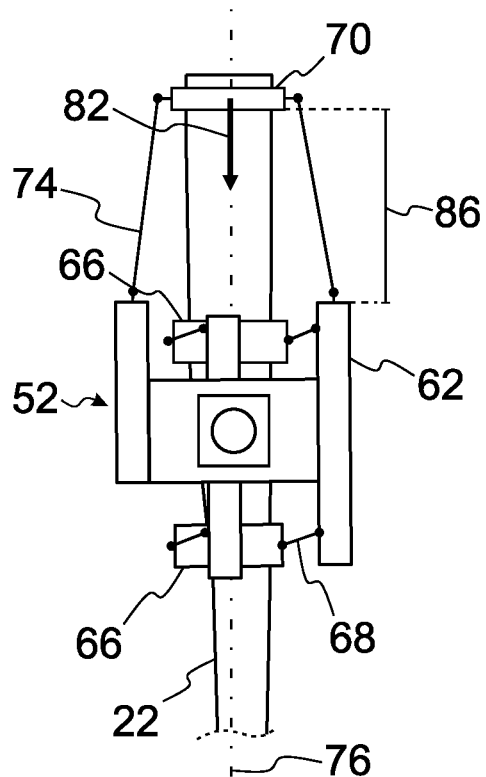
Figure 5C:
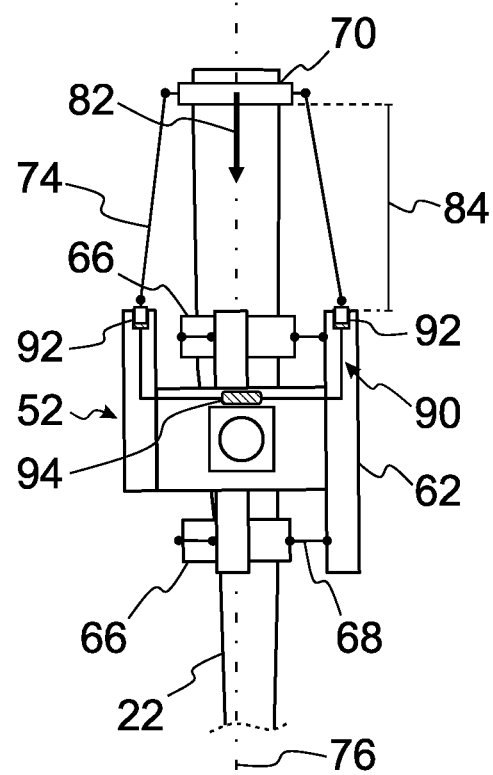

In embodiments, the connecting members 74 may be compressed or bent or may expand during rotating of the blade 22, particularly during a change of the axial load 82. For example, FIG. 5A shows the blade 22 in a first orientation, e.g., with the longitudinal blade axis 76 parallel to the reference plane 78 or a horizontal plane. In particular, the axial load may be small or substantially zero. The gripping part 66 of the gripper may support a transverse load 83 of the blade 22, the transverse load 83 particularly including at least substantially the weight of the blade 22. The root support device 70 and a gripper frame 62 of the gripper 52, the gripper frame 62 being connected to the connecting members 74, may be arranged at a distance 84 in an axial direction of the blade 22. In a second orientation, particularly in an inclined orientation as shown in FIGS. 5B and 5C, the axial load 82 may be larger than in the first orientation. The connecting members 74 may be compressed or bent.

According to embodiments, the gripper frame 62 is connected to the root support device 70 via the connecting members 74. The gripper frame 62 can be axially movable relative to the gripping part 66. The gripping part 66 and gripper frame 62 may be connected by a gripper joint 68. The gripper joint 68 may include for example a parallelogram hinge mechanism, rods with pivot joints or a slide rail mechanism. For example, in FIG. 5B the gripper joint 68 includes a parallelogram hinge mechanism including rods with pivot joints. In the inclined orientation shown in FIG. 5B, the connecting members 74 are compressed by the axial load 82. The connecting members are compressed such that the root support device 70 and the gripper frame 62 are spaced at a reduced axial distance 86. The reduced axial distance 86 may particularly be smaller than the distance 84 in the first orientation. The gripper frame 62 may be axially movable relative to gripping part 66 such that an axial load 82 transmitted from the root support device 70 via the connecting members 74 to the gripper frame 62 is not transmitted to the gripping part 66. For example, a slipping of the gripping part 66, particularly of the gripper pads, over the outer skin of the blade 22 in an axial direction may be reduced or avoided.

In some embodiments, the blade lifting assembly 50 includes an actuator apparatus 90 configured for actuating the connecting members 74 in an axial direction of the blade 22. The actuator apparatus 90 may be configured for providing an axial force on the connecting members 74, particularly for pushing and/or pulling the members 74 in a direction of the longitudinal blade axis 76. For example, the actuator apparatus 90 may include a linear actuator.

According to embodiments, the actuator apparatus 90 includes at least one of a hydraulic actuator, an electric actuator and a pneumatic actuator. In some embodiments, the actuator apparatus 90 is arranged on the gripper frame 62. In further embodiments, the actuator apparatus 90 may be arranged on the root support device 70. In the exemplary embodiment of FIG. 5C, the blade lifting assembly 50 includes an actuator apparatus 90. The actuator apparatus 90 includes actuators 92, particularly hydraulic actuators arranged on the gripper frame 62.

In some embodiments, the actuator apparatus 90 includes at least two actuators 92. The at least two actuators 92 can be interconnected for balancing the axial load 82 among the at least two actuators 92. In particular, the at least two actuators 92 may be hydraulic actuators and may be hydraulically interconnected. In further embodiments, the at least two actuators may be pneumatic actuators and may be pneumatically interconnected.

According to embodiments, the at least two actuators 92 are hydraulic actuators, wherein the at least two actuators 92 are connected to a hydraulic accumulator 94 for balancing the axial load 82 among the at least two actuators 92. For example, in FIG. 5C the actuators 92 are hydraulically interconnected and connected to a hydraulic accumulator 94. The hydraulic accumulator 94 may act as a pressure storage reservoir for balancing the axial load 82 among the actuators 92.

In some embodiments, the blade lifting assembly 50 includes an assembly controller. The assembly controller can be configured for controlling the actuator apparatus 90 based on the axial load 82 of the blade 22. In particular, the assembly controller may be configured for receiving a load signal indicative of the axial load 82 of the blade 22. The load signal may be based on a measurement of the axial load 82 by a load sensor of the blade lifting assembly 50. The assembly controller may be configured to control an axial force provided by the actuator apparatus 90, e.g. by controlling a pressure in a hydraulic actuator of the actuator apparatus 90. The assembly controller may be arranged in or on the blade lifting assembly 50. In other embodiments, the assembly controller may be located within any other component of the blade lifting assembly 50 or at a location outside the blade lifting assembly 50. The assembly controller may include a computer or other suitable processing unit. In embodiments, the assembly controller may include suitable computer-readable instructions that, when implemented, configure the assembly controller to perform various different functions, such as receiving, transmitting and/ or executing control signals of the blade lifting assembly 50, particularly according to embodiments described herein.

In embodiments, the actuator apparatus 90 is configured for actuating the connecting members 74 such that a distance 84 between the gripper 52 and the root support device 70 is maintained at least substantially constant. In particular, the distance 84 may be maintained at least substantially constant during rotating of the blade 22. The actuator apparatus 90 may be controlled by the assembly controller to maintain the distance 84 at least substantially constant. For example, in an actuator apparatus 90 including a hydraulic actuator, a pressure of the hydraulic actuator may be controlled. In particular, "at least substantially constant" may be understood such that a change in the distance 84 by rotating from a first orientation to a second orientation is smaller than 10% of the distance 84, particularly smaller than 5% or smaller than 3%. In embodiments, the actuator apparatus 90 may be controlled to compensate for a compression or bending of the connecting members 74. Maintaining the distance 84 at least substantially constant may reduce or avoid an axial gripper force of the gripper 52 on the blade 22. In particular, slipping of the gripping part 66, particularly of the gripper pads, over the outer skin of the blade 22 in an axial direction may be reduced or avoided. In some embodiments, the gripper frame 62 may be rigidly connected to the gripping part 66. In further embodiments, the gripper 52 may include gripper joints 68 configured for allowing an axial movement of the gripper frame 62 relative to the gripping part 66 according to embodiments described herein, as shown for example in FIG. 5C.

According to embodiments of the present disclosure, a method 100, 200 of mounting a blade 22 to or unmounting a blade 22 from a rotor hub 20 of a wind turbine 10 is provided. The method 100, 200 may particularly use a blade lifting assembly 50 or a lifting apparatus 96 according to embodiments described herein. The method 100, 200 includes gripping a central region 54 of the blade using a gripper 52. In embodiments, the central region 54 gripped by the gripper 52 includes the center of of the blade 22. In particular, gripping the blade 22 may include gripping the blade 22 with gripping members 67 at a first axial position and at a second axial position with the center of gravity of the blade 22 axially disposed between the first axial position and the second axial position. Gripping the blade 22 may include gripping the blade 22 on a first side of the blade 22 and on a second side of the blade 22 according to embodiments described herein.

In embodiments, the method 100, 200 includes mounting a root support device 70 to a root section 71 of the blade 22. In particular, the root support device 70 may be clamped to the root section 71 and/or the root support device 70 may be mounted to the root section 71 by joining a first joint component 72 of the root support device 70 to a second joint component 73 of the root section 71.

According to embodiments, the method 100, 200 includes connecting the root support device 70 to the gripper 52 using connecting members 74, the connecting members 74 being configured for transmitting an axial load 82 of the blade 22 from the root support device 70 to the gripper 52. The connecting members 74 may particularly transmit an axial load 82 in an inclined orientation of the blade 22, particularly inclined with respect to a reference plane 78 or a horizontal plane.

In embodiments, the method 100, 200 includes moving the blade 22 in a vertical direction using a crane 97 having a crane hook 98, the crane hook 98 being hooked to the gripper 52. In particular, moving the blade 22 in a vertical direction may include raising the blade 22 towards the rotor hub 20 or lowering the blade 22 towards the support surface 14 beneath the rotor hub 20. In embodiments, moving the blade 22 in a vertical direction may particularly be understood as moving the blade 22 from a first height to a second height different from the first height. Moving the blade 22 in a vertical direction may include moving the blade 22 along a vertical axis. In embodiments, moving the blade 22 in a vertical direction may include moving the blade in a vertical direction inclined to a vertical axis.

According to embodiments, the method 100, 200 includes rotating the blade 22 about a rotational axis perpendicular to a longitudinal blade axis 76 of the blade 22 using a blade rotation device 56 of the gripper 52. In particular, the rotational axis may be a horizontal axis or the rotational axis may be at least substantially perpendicular to a longitudinal tower axis 79 of the tower 12. In some embodiments, rotating the blade 22 includes rotating the blade 22 to an inclined orientation, wherein in the inclined orientation an angle 80 between the longitudinal blade axis 76 and a reference plane 78 perpendicular to a longitudinal tower axis 79 is larger than 20 degrees, particularly larger than 25 degrees, and/or to an angle 80 of maximum 60 degrees, particularly of maximum 50 degrees or maximum 45 degrees. Rotating the blade 22 to an inclined orientation between a horizontal orientation and a vertical orientation may for example require a smaller counterweight to balance the weight of the blade 22 relative to the crane link 67 as compared to a vertical orientation of the blade 22.

In embodiments, the blade 22 may be rotated to an angle 80 larger than 30 degrees, particularly larger than 45 degrees or larger than 60 degrees. For example, the blade 22 may be rotated to an angle 80 of approximately 90 degrees.

In embodiments, the blade 22 may be rotated to an angle 80 to match an orientation of a blade connection site of the rotor hub 20 for mounting the blade 22 to the rotor hub 20. In some embodiments, the blade 22 may be rotated from an inclined orientation to an at least substantially horizontal orientation for placement of the blade 22 on supporting surface 14 during unmounting of the blade 22 from the rotor hub 20. Rotating the blade 22 to an orientation closer to a vertical orientation or to a vertical orientation may for example reduce a crane height needed to move the blade 22 between the support surface 14 and the rotor hub 20.

In embodiments, the method 100, 200 includes connecting the blade 22 to the rotor hub 20, particularly for mounting of the blade 22 to the rotor hub 20, or disconnecting the blade 22 from the rotor hub 20, particularly for unmounting of the blade 22 from the rotor hub 20. In some embodiments, the method 100, 200 may include releasing the blade 22. Releasing the blade 22 may include releasing the blade 22 from the gripper 52. Releasing the blade 22 may include unmounting the root support device 70 from the root section 71.

It is understood that at least some of the above method elements may be performed in a different order than described. In particular, connecting the blade 22 to the rotor hub 20 or disconnecting the blade 22 from the rotor hub 20 can be performed at different stages.

Figure 6:
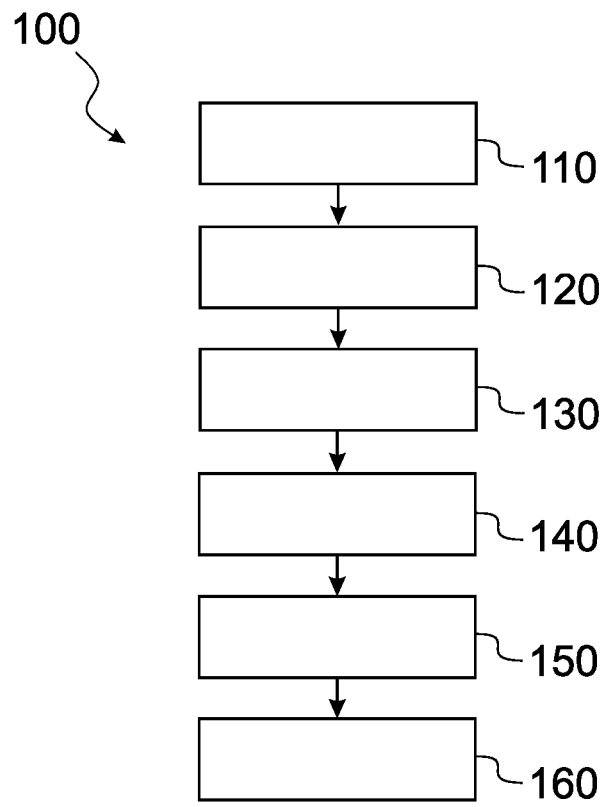
FIG. 6 illustrates a flow diagram according to embodiments of a method of mounting a blade to a rotor hub.

For example, FIG. 6 illustrates a flow diagram of a method 100 for mounting a blade 22 to a rotor hub 20. At block 110, the method 100 includes gripping the blade 22 using a gripper 52. At block 120, a root support device 70 is mounted to the root section 71 of the blade 22. At block 130, the root support device 70 is connected to the gripper 52 using connecting members 74. At block 140, the blade 22 is moved in a vertical direction, particularly in an upward direction towards the rotor hub 20. At block 150, the blade is rotated about a rotational axis, e.g., about a horizontal axis. In particular, the blade 22 is rotated by an angle 80 to match an orientation of a blade connection site of the rotor hub 20. At block 160, the blade 22 is connected to the rotor hub 20, particularly to the blade connection site of the rotor hub 20. The blade 22 may be released from the gripper 52 and the root support device 70.

Figure 7:
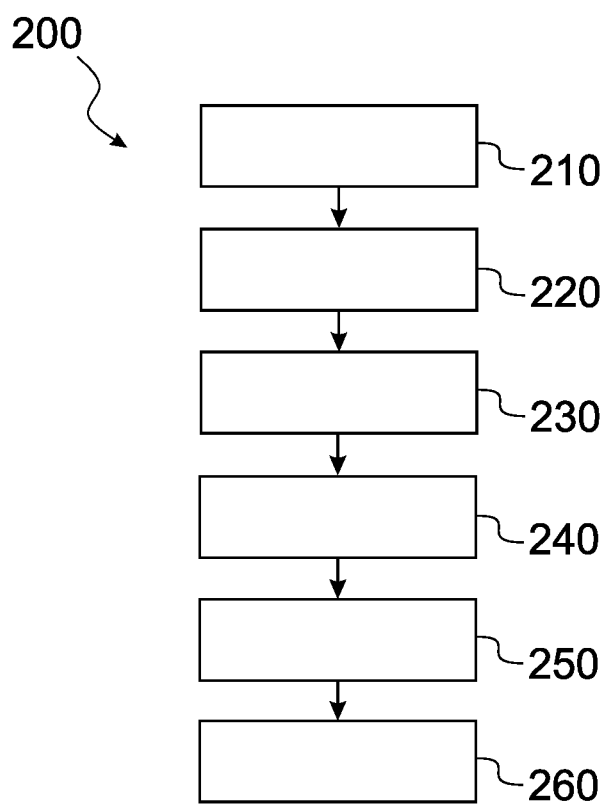
FIG. 7 illustrates a flow diagram according to embodiments of a method of unmounting a blade from a rotor hub.

FIG. 7 illustrates a flow diagram of a method 200 for unmounting a blade 22 from a rotor hub 20, the blade 22 particularly being connected to a rotor hub 20 of a wind turbine 10. Blocks 210, 220 and 230 may be performed analogously to blocks 110, 120 and 130 of method 100. At block 240, the blade 22 is disconnected from the rotor hub 20. At block 250, the blade 22 is moved in a vertical direction, particularly in a downward direction towards support surface 14. At block 260, the blade 22 is rotated, particularly to an at least substantially horizontal orientation. The blade 22 may be lowered to the support surface 14. The blade may be released from the gripper 52 and the root support device 70.

In some embodiments, the blade 22 can be a segmented blade including at least two blade segments. The at least two blade segments can be joined at least one blade joint, e.g. at one, two or more blade joints. For example, the blade can include a root segment including a root of the blade 22. The segmented blade can include one or more extension segments configured for joining to the root segment along the blade longitudinal axis, particularly a tip segment including a tip of the blade 22. In some embodiments, the segmented blade may include a chordwise segment configured for joining to the root segment in a chordwise direction at a chordwise joint. For example, the chordwise segment can include a part of the blade 22 at the maximum chordwise extension of the blade 22.

In some embodiments, the blade lifting assembly can be configured for supporting a segmented blade or a blade segment of the segmented blade at a blade of the segmented blade. According to embodiments, a blade lifting assembly 50 according to embodiments may be configured for mounting a blade segment of the blade 22 to the rotor hub 20 or unmounting a blade segment of the blade 22 from the rotor hub 20, particularly a root segment of a segmented blade. In embodiments, the gripper 52 of the blade lifting assembly 50 can be configured for gripping a central axial region of a blade segment, e.g. of a root segment. In embodiments, at least two blade segments of a segmented blade may be mounted or unmounted together to the rotor hub, e.g. the full blade or a root segment together with a chordwise segment. In further embodiments, one or more blade segments of the blade, e.g. a root segment, may be mounted or unmounted individually to or from the rotor hub. According to some embodiments, the root support device can be configured to be mounted to a root section of a blade segment of a blade, particularly to a root section of a root segment.

Embodiments of the present disclosure may provide the advantage that during mounting or unmounting of a blade, axial loads of the blade can be supported at a root section of the blade. The blade may be lifted and rotated using a gripper, particularly without applying strong gripping forces onto the outer skin of the blade. According to embodiments, reinforcements to the loadbearing structure of the blade or to the outer skin of the blade to support strong gripping forces may be avoided. Rotating the blade may enable mounting the blade to the rotor hub at a lower height with respect to the ground or at various orientations with respect to the hub. In particular, cranes with a lower height may be used for mounting or unmounting the blade or a number of angular motions of the rotor hub during mounting or unmounting may be reduced. In embodiments, time and/or costs for mounting and unmounting blades to or from the rotor hub may be reduced, in particular crane costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A blade lifting assembly for mounting or unmounting a blade relative to a rotor hub of a wind turbine, comprising:
   a gripper assembly configured to grip a central region of the blade, the gripper assembly comprising a frame and first gripping pads at a first axial position on the frame and second gripping pads spaced axially apart from the first gripping pads at a second axial position along the frame, wherein the first and second gripping pads are configured to engage against sides of the blade at the first and second axial positions;
   the gripper assembly further comprising a blade rotation device supported by the frame between the first and second axial positions of the gripping pads and configured to rotate the blade about a rotational axis perpendicular to a longitudinal blade axis of the blade;
   a root support device spaced at a fixed axial distance from an end of the frame, the root support device axially aligned with the frame so as to mount entirely to a root section of the blade at the fixed axial distance while the gripper assembly remains engaged with the central region of the blade in use of the blade lifting assembly to raise or lower the blade relative to the rotor hub and to mount or unmount the blade from the rotor hub; and
   connecting members defining the fixed axial distance and having a first end that connects to the root support device and an opposite end that connects to the frame and transmit an axial load of the blade from the root support device to the frame.

2. The blade lifting assembly according to claim 1, wherein the root support device further comprises a band clamp configured to engage around and clamp against the root section of the blade or a first joint component configured to connect to a second joint component on the root section of the blade to mount the root support device to the root section of the blade.

3. The blade lifting assembly according to claim 1, wherein the frame is configured to be axially movable relative to the blade while the gripping pads are maintained at a fixed position of the first and second axial positions of the gripping pads against the sides of the blade.

4. The blade lifting assembly according to claim 1, wherein the blade rotation device is configured to rotate the blade to an inclined orientation at an angle between the longitudinal blade axis and a reference plane perpendicular to a longitudinal tower axis that is larger than 20 degrees, the blade rotation device comprising:

a first device part connected to the frame, the first device part comprising a crane link extending therefrom, the crane link having length so as to be engaged by a crane hook;

the first device part rotatably mounted relative to the frame; and a motor configured to rotate the first device part to rotate the blade to the inclined orientation.

5. The blade lifting assembly according to claim 1, further comprising an actuator apparatus configured to actuate the connecting members in an axial direction of the blade.

6. The blade lifting assembly according to claim 5, wherein the actuator apparatus comprises one of a hydraulic actuator, an electric actuator, or a pneumatic actuator.

7. The blade lifting assembly according to claim 5, wherein the actuator apparatus comprises at least two actuators interconnected for balancing axial load of the blade between the two actuators.

8. The blade lifting assembly according to claim 7, wherein the two actuators are hydraulic actuators connected to a hydraulic accumulator for balancing the axial load between the two actuators.

9. The blade lifting assembly according to claim 5, further comprising an assembly controller configured to control the actuator apparatus based on an axial load of the blade.

10. The blade lifting assembly according to claim 5, wherein the actuator apparatus is configured to actuate the connecting members such that a distance between the gripper and the root support device is maintained substantially constant.

11. The blade lifting assembly according to claim 1, wherein the connecting members comprise at least one of a rod, a beam, a wire, a chain, or a rope.

12. A lifting apparatus for mounting or unmounting a blade relative to a rotor hub of a wind turbine, comprising:

a crane comprising a crane hook; and the blade lifting assembly according to claim 1, wherein the gripper assembly is hooked to the crane hook.

* * * * *